Jan. 17, 1956  E. J. WHIFFEN  2,730,952
VARIABLE CAPACITY PUMP
Filed Sept. 9, 1953
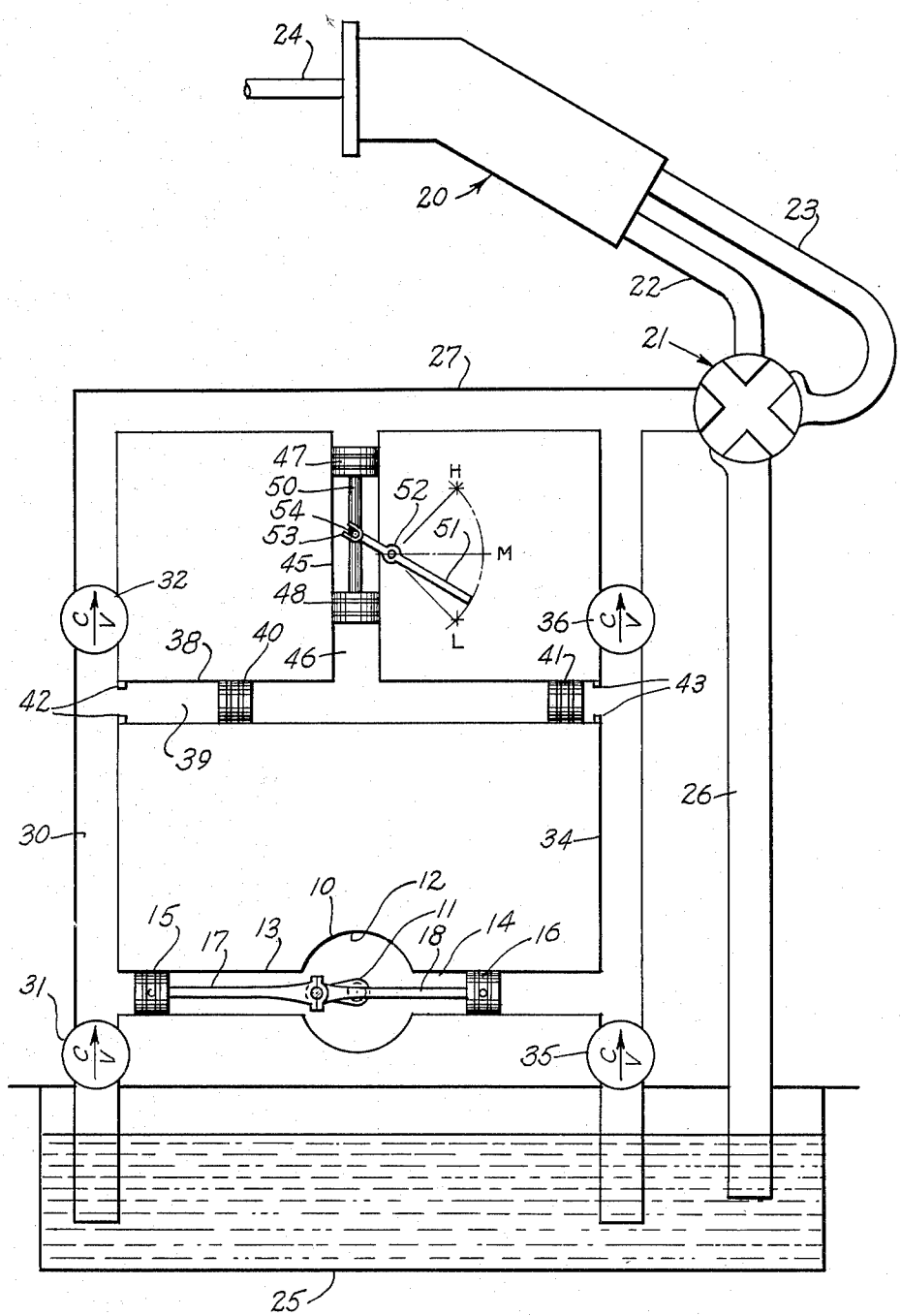
INVENTOR.
Edwin J. Whiffen
BY
McMorrow, Berman + Davidson
ATTORNEYS

United States Patent Office 2,730,952
Patented Jan. 17, 1956

2,730,952
VARIABLE CAPACITY PUMP
Edwin J. Whiffen, Rye, N. Y.

Application September 9, 1953, Serial No. 379,219

2 Claims. (Cl. 103—37)

This invention relates to variable speed hydraulic transmissions and more particularly to a hydraulic transmission for transmitting power from a driving to a driven mechanism with a minimum loss of power in the transmission.

It is among the objects of the invention to provide an improved hydraulic transmission which is effective to transmit power at selected speed ratios from a driving to a driven mechanism by positive movement of bodies of incompressible hydraulic fluid and without material slippage or fluid friction; which does not cause material heating of the transmission fluid or loss of power in the generation of heat; which is smooth in operation and effective to vary the speed continuously from zero up to the maximum speed ratio for which the transmission is designed; and which is readily controllable to provide forward and reverse drives and a neutral position in which no power is transmitted.

Other objects and advantages will become apparent from a consideration of the following description and the appended claims in conjunction with the accompanying drawing wherein the single figure is a diagrammatic illustration of a hydraulic transmission disclosing the invention.

With continued reference to the drawing, the numeral 10 indicates a positive displacement, reciprocating pump having a crankshaft 11 mounted in a casing 12 and adapted to be driven by a driving mechanism, such as an automotive vehicle engine, a pair of oppositely disposed pump cylinders 13 and 14, pistons 15 and 16 reciprocable in the cylinders 13 and 14 respectively, and connecting rods 17 and 18 respectively connecting the pistons 15 and 16 to the crankshaft 11.

The numeral 20 generally designates a positive displacement hydraulic motor of known construction adapted to be drivingly connected to a driven mechanism, such as the differential or driving wheels of an automotive vehicle, and the numeral 21 generally designates a selectively positionable or manually controllable four-way valve, also of well known construction.

The valve 21 is connected to the motor 20 by parallel fluid conduits 22 and 23 and is effective to reverse the pressure and discharge connections of the transmission between the conduits 22 and 23 to control the direction of rotation of the motor shaft 24.

A suitable tank 25 is provided adjacent the pump 10 and constitutes a sump for hydraulic fluid and a fluid vent or return conduit 26 leads from the valve 21 to the sump 25 for returning exhaust fluid from the motor 20 to the sump and also for bypassing the fluid away from the motor when it is desired to maintain the motor in a neutral condition. A header conduit 27 is connected at one end to the valve 21 and extends from the valve for conducting fluid under pressure from the pump 10 to the valve.

With this arrangement, the four-way valve 21 is connected to the fluid supply line, the fluid vent or return line, and the motor conduits 22 and 23 and is effective to reverse the connections between the motor conduits 22 and 23 and the fluid supply and return lines 27 and 26 or to connect the fluid pressure line 27 and one or the other of the motor conduits 22 and 23 to the fluid return line 26, if desired.

The outer end of each pump cylinder 13 and 14 constitutes an intake and outlet opening for the pump and a conduit 30 extends from the interior of the sump 25 to the outer end of the pump cylinder 13 and from the outer end of the pump cylinder 13 to the end of the header 27 remote from the valve 21, the conduit 30 being connected to the header in a manner to provide a continuous fluid passage from the sump to the valve 21. A check valve 31 is disposed in the conduit 30 between the sump 25 and the pump cylinder 13 and restricts the flow of fluid through this portion of the conduit to a direction from the sump to the pump cylinder, precluding return flow of fluid from the pump back to the sump. A check valve 32 is disposed in the conduit 30 between the outer end of the pump cylinder 13 and the header 27 and restricts the flow of fluid through the corresponding portion of the conduit 30 to a direction from the pump to the header, precluding return flow of fluid from the header back to the pump.

A conduit 34, similar to the conduit 30, extends from the interior of the sump 25 to the outer end of the pump cylinder 14, and a check valve 35 disposed in this conduit 34 between the sump 25 and the pump cylinder 14 restricts the flow of fluid through this portion of the conduit 34 to a direction from the sump to the pump cylinder. A check valve 36 is disposed in the conduit 34 between the pump cylinder 14 and the header 27 and restricts the flow of fluid through the corresponding portion of the conduit 34 to a direction from the pump to the header, the check valves in each of the conduits 30 and 34 also precluding flow of fluid from one conduit back through the other conduit to the sump enabling the pump to build up fluid pressure in the header 27 for delivery through the valve 21 to the motor 20.

A suitable structure 38 provides a cylinder 39 extending between the conduits 30 and 34 and connected at one end to the conduit 30 between the check valves 31 and 32 and at its other end to the conduit 34 between the check valves 35 and 36. This cylinder 39 may have a diameter substantially equal to the diameter of the pump cylinders 13 and 14, and free pistons 40 and 41 are mounted in the cylinder 39 in spaced apart relationship to each other for reciprocation toward and away from the adjacent ends of the cylinder. Stop means 42 are provided in the cylinder structure 38 at the end of this structure connected to the conduit 30 to limit movement of the free piston 40 outwardly of the cylinder 39, and similar stop means 43 are provided in the cylinder structure 38 at the end of this structure joined to the conduit 34 to limit movement of the free piston 41 outwardly of the corresponding end of the cylinder 39. A suitable structure 45 provides a second cylinder 46 connected at one end to the cylinder 39 preferably at the mid-length location of this cylinder and connected at its other end to the header 27. A pair of pistons 47 and 48 are slidably disposed in the cylinder 46 in a predetermined spaced apart relationship to each other by a connecting rod 50 extending between these two pistons. A hand lever 51 is pivotally mounted intermediate its length on a fixed fulcrum 52 and extends through an opening in the cylinder structure 45 between the pistons 47 and 48. This lever has on its end within the cylinder 46 a fork construction 53 which receives a pin 54 projecting from the piston connecting rod 50 substantially at the mid-length location of this rod, so that the pistons 47 and 48 can be moved longitudinally of the cylinder 46 by moving the lever 51 about its fixed fulcrum 52.

While the manually operated means for moving the pistons 47 and 48 have been illustrated and described above as a simple hand lever, it is to be understood that any suitable means for moving the pistons 47 and 48 longitudinally of the cylinder 46 may be employed and may be controlled manually or otherwise, without in any way exceeding the scope of the invention.

The conduits 30 and 34 and the header 27, as well as the end portions of the cylinder 39 between the free pistons 40 and 41 and the adjacent conduits 30 and 34, are filled with hydraulic fluid placed under pressure by operation of the pump 10 and the pressure of this fluid acts upon the outer end of the piston 47 to neutralize a corresponding pressure acting upon the outer end of the piston 48, as will presently be described.

The portions of the cylinders 46 and 39 between the free pistons 40 and 41 and the piston 48 are filled with a body of hydraulic fluid which maintains the free pistons 40 and 41 in spaced apart relationship to each other.

Assuming that the conduits 30 and 34 and the header 27 are filled with hydraulic fluid, that the pump 10 is in operation, and the amount of hydraulic fluid between the free pistons 40 and 41 is such that the distance between the outer ends of these pistons is less than the length of the cylinder 39, as the pump piston 16 moves inwardly relative to the pump cylinder 14, and the pump piston 15 simultaneously moves outwardly relative to the pump cylinder 13, the piston 16 will create a suction that will tend to draw hydraulic fluid from the sump 25 through the check valve 35 into the portion of the pump cylinder 14 disposed outwardly of the piston 16 and into the portion of the conduit 34 between the valves 35 and 36. As the pump piston 15 moves outwardly, it will force hydraulic fluid from the outer end portion of the pump cylinder 13 into the portion of the conduit 30 between the valves 31 and 32. Some of this fluid forced out by the piston 15 will enter the cylinder 39 to the end of this cylinder connected to the conduit 30 and will force the free pistons 40 and 41 toward the conduit 34 returning whatever fluid was in the cylinder 39 between the piston 41 and the end of the cylinder 39 connected to the conduit 34 and the pump cylinder 14, thereby reducing the amount of hydraulic fluid drawn by the inward movement of the piston 16 from the sump 25 through the valve 35. If the cubic displacement of the free pistons 40 and 41 in the cylinder 39 is as great as the cubic displacement of the pump pistons 15 and 16 in the corresponding pump cylinders 13 and 14, the hydraulic transmission will be neutralized and no fluid will be drawn from the sump 25 or forced into the header 27.

Assuming that the transmission is neutralized or inoperative, as described above, and that it is desired to place it in an operative condition, the pistons 47 and 48 are moved by the hand lever 51 toward the cylinder 39, thereby increasing the amount of hydraulic fluid in the body of fluid disposed in the cylinder 39 between the free pistons 40 and 41, forcing these pistons further apart and reducing their stroke. As soon as the stroke of the free pistons 40 and 41 has been reduced to an extent such that the volumetric capacity of these pistons in the cylinder 39 is less than the volumetric capacity of the pump pistons 15 and 16 in the pump cylinders 13 and 14, some fluid will be drawn by the pump from the sump 25 through the valves 31 and 35 and forced through the conduits 30 and 34 past the valves 32 and 36 into the header 27. If the pistons 47 and 48 are moved toward the cylinder 39 to an extent sufficient to force both of the free pistons 40 and 41 against the corresponding stops 42 and 43 and discontinue reciprocation of these free pistons in the cylinder 39, the pump will draw fluid from the sump corresponding to the maximum displacement capacity of the pump and will force all of this fluid into the header 27. The speed ratio of the transmission can be varied by infinitesimal increments between zero transmission and the predetermined maximum ratio dependent upon the relative capacities of the pump 10 and motor 20 by adjustably positioning the pistons 47 and 48 longitudinally of the cylinder 46. The pressure of the hydraulic fluid in the header 27 acting on the outer end of the piston 47 counteracts or neutralizes the pressure of the hydraulic fluid between the pistons 40, 41 and 48 acting on the outer end of the piston 48, so that the pistons 47 and 48 can be moved longitudinally of the cylinder 46 with very slight effort.

With the above described arrangement, the operation of the free pistons 40 and 41 merely neutralizes a predetermined portion of the operation of the pump 10, but whatever portion of the pumping operation is retained acts positively on the hydraulic fluid to force the fluid through the conduits and the control valve to the motor 20 with no reduction in pressure. That is, the pressure of the hydraulic fluid may be maintained at a constant or predetermined value and only the quantity of the fluid varied to control the operational speed of the motor. There is no shearing of the fluid, causing fluid friction, nor any restricting or braking of the fluid flow, such as would cause heat producing friction and consequent loss of power, the hydraulic fluid being maintained in a substantially cool condition at all times and no important portion of the engine power being converted into heat in the hydraulic fluid.

While the two piston pump, as illustrated, will provide a smooth operation of the motor 20, it is to be understood that the number of pump pistons and of the associated conduits could be increased, or the transmission unit, as diagrammatically illustrated, could be duplicated or multiplied to provide a more constant flow of hydraulic fluid to the motor, if that should be found desirable. It is also to be noted that the transmission would be operative with a single pump piston and single free piston, if such a simplified form of apparatus should be found desirable for a particular installation.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In a pumping assembly for a variable speed hydraulic transmission, a fluid conduit system including first and second conduits, a header extending between one end of said conduits, a sump into which the other ends of the conduits extend, third and fourth conduits respectively connected between the first and second conduits at locations inward from the opposite ends of the first and second conduits, and a fifth conduit connected between intermediate portions of the header and third conduit; first and second check valves in the first and second conduits respectively, between the sump and fourth conduit; third and fourth check valves in the first and second conduits respectively, between the header and the third conduit, all of said valves being arranged to permit flow from the sump to the header; reciprocating pump means working in the fourth conduit to draw fluid from the sump through the first and second conduits alternately, past the several check valves toward the header; free floating reciprocating pistons spaced apart in the third conduit at opposite sides of the fifth conduit, said pistons being reciprocable responsive to reciprocation of said pump means; a normally stationary piston in the fifth conduit; hydraulic fluid filling the space in the third conduit between the free floating pistons and the space in the fifth conduit communicating with said third conduit space; and means for adjusting the position of the last named piston to adjust the spacing between the free floating pistons, whereby to selectively vary the discharge of said pump means.

2. In a pumping assembly for a variable speed hydraulic transmission, a fluid conduit system including first and second conduits, a header extending between one end of said conduits, a sump into which the other ends of the conduits extend, third and fourth conduits respectively connected between the first and second conduits at locations inward from the opposite ends of the first and second conduits, and a fifth conduit connected between intermediate portions of the header and third conduit; first and second check valves in the first and second conduits respectively, between the sump and fourth conduit; third and fourth check valves in the first and second conduits respectively, between the header and the third conduit, all of said valves being arranged to permit flow from the sump to the header; a pair of reciprocating pump pistons linked for simultaneous reciprocation an unvarying distance apart within the fourth conduit, to draw fluid from the sump through the first and second conduits alternately, past the several check valves toward the header; free floating reciprocating pistons spaced apart in the third conduit at opposite sides of the fifth conduit, said floating pistons reciprocating responsive to reciprocation of the pump pistons; a normally stationary piston in the fifth conduit; hydraulic fluid filling the space in the third conduit between the free floating pistons and the space in the fifth conduit communicating with said third conduit space; and means for adjusting the position of the last named piston to adjust the spacing between the free floating pistons, whereby to selectively vary the discharge of said pump pistons.

References Cited in the file of this patent

UNITED STATES PATENTS

| | | |
|---|---|---|
| 178,701 | Adams | June 13, 1876 |
| 1,423,386 | Bair | July 18, 1922 |
| 2,074,618 | Roeder | Mar. 23, 1937 |